(12) United States Patent (10) Patent No.: US 9,187,073 B2
Kim et al. (45) Date of Patent: Nov. 17, 2015

(54) NEGATIVE PRESSURE FORMING DEVICE FOR BRAKE OF VEHICLE

(71) Applicant: Hyundai Motor Company, Seoul (KR)

(72) Inventors: Yoon Joo Kim, Yongin-si (KR); Hyun Jun Lim, Incheon (KR); Dong Hee Han, Seoul (KR); Seung Kook Han, Suwon-si (KR); Jong Il Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 106 days.

(21) Appl. No.: 14/089,155

(22) Filed: Nov. 25, 2013

(65) Prior Publication Data

US 2014/0238017 A1 Aug. 28, 2014

(30) Foreign Application Priority Data

Feb. 27, 2013 (KR) ........................ 10-2013-0021301

(51) Int. Cl.
| | |
|---|---|
| *F02B 33/44* | (2006.01) |
| *F02B 33/00* | (2006.01) |
| *B60T 17/02* | (2006.01) |
| *F02M 35/10* | (2006.01) |
| *F02B 39/10* | (2006.01) |
| *F02B 29/04* | (2006.01) |
| *F02M 25/07* | (2006.01) |
| *F02D 41/00* | (2006.01) |

(52) U.S. Cl.
CPC ................. *B60T 17/02* (2013.01); *F02B 39/10* (2013.01); *F02M 35/10229* (2013.01); *F02B 29/0406* (2013.01); *F02D 41/0007* (2013.01); *F02D 2200/0406* (2013.01); *F02D 2250/41* (2013.01); *F02M 25/0711* (2013.01); *F02M 25/0727* (2013.01)

(58) Field of Classification Search
CPC .................... F02M 35/10229; F02M 25/0711; F02B 39/10; F02B 37/013; F02D 41/0007; F02D 2250/41
USPC ...................................... 60/612, 611; 123/562
See application file for complete search history.

(56) References Cited

U.S. PATENT DOCUMENTS

| | | | | |
|---|---|---|---|---|
| 6,062,026 | A * | 5/2000 | Woollenweber et al. | ........ 60/612 |
| 8,627,662 | B2 * | 1/2014 | Freund et al. | ................. 60/605.2 |
| 2004/0194466 | A1 * | 10/2004 | Kawamura et al. | ............. 60/612 |

(Continued)

FOREIGN PATENT DOCUMENTS

| | | | |
|---|---|---|---|
| DE | 102010023188 A1 * | 12/2011 | .............. F02B 37/04 |
| JP | 2000-28906 A | 10/2000 | |

(Continued)

OTHER PUBLICATIONS

Machine generated translation of KR 2002080868 A.*

*Primary Examiner* — Thai Ba Trieu
*Assistant Examiner* — Ngoc T Nguyen
(74) *Attorney, Agent, or Firm* — Morgan, Lewis & Bockius LLP

(57) ABSTRACT

A brake vacuum pressure forming device for a motor vehicle may include a vacuum chamber supplying a vacuum pressure boosting a break operating force, an electric supercharger connected to the vacuum chamber to supply vacuum pressure thereto, a first vacuum pressure supply path connecting the electric supercharger and the vacuum chamber, and a vacuum pressure control valve mounted on the first vacuum pressure supply path and opening and closing the first vacuum pressure supply path.

9 Claims, 1 Drawing Sheet

(56) References Cited

U.S. PATENT DOCUMENTS

| | | | |
|---|---|---|---|
| 2006/0064981 A1* | 3/2006 | Kojima et al. | 60/612 |
| 2013/0074813 A1* | 3/2013 | Thalhofer | 123/559.1 |
| 2013/0333665 A1* | 12/2013 | Pursifull | 123/399 |
| 2014/0144412 A1* | 5/2014 | An et al. | 123/562 |

FOREIGN PATENT DOCUMENTS

| | | |
|---|---|---|
| JP | 2000-282906 A | 10/2000 |
| KR | 2002-0080868 A | 10/2002 |
| KR | 10-2012-0006239 | 1/2012 |
| KR | 10-2013-0003115 | 1/2013 |

* cited by examiner

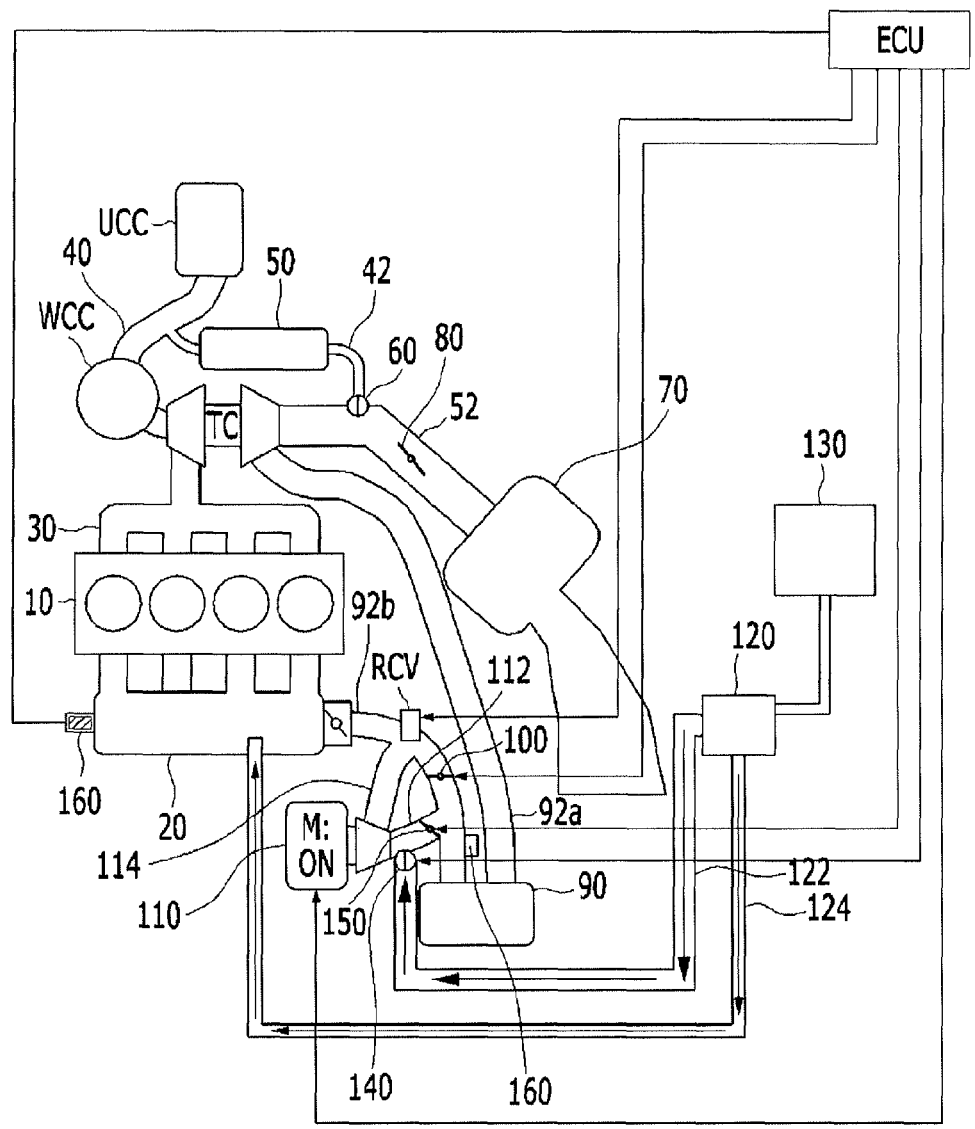

NEGATIVE PRESSURE FORMING DEVICE FOR BRAKE OF VEHICLE

CROSS-REFERENCE TO RELATED APPLICATION

The present application claims priority to Korean Patent Application No. 10-2013-0021301 filed on Feb. 27, 2013, the entire contents of which is incorporated herein for all purposes by this reference.

BACKGROUND OF THE INVENTION

1. Field of the Invention

The present invention relates to a vacuum pressure forming device of a vehicle and, more particularly, to a vacuum pressure forming device of a vehicle capable of forming a brake vacuum pressure by using an electric supercharger when necessary.

2. Description of Related Art

In a vehicle, generally, ambient air is introduced into the vehicle, mixed with fuel, and supplied to an engine, and the engine burns the mixture of air and fuel to obtain power required for driving the vehicle.

For combustion in the course of generating power by driving an engine, ambient air must be sufficiently supplied to obtain a desired output and combustion efficiency of the engine. Thus, in order to increase combustion efficiency and enhance an output of an engine, a supercharger or a turbo charger that pressurizes air for combustion and supplies the pressurized air is applied to a vehicle.

The supercharger has a structure compressing air to be supplied to an engine by using pressure of an exhaust gas discharged from the engine.

However, there is a limitation in compressing intake air with only pressure of exhaust gas and supplying the same to an engine according to a running situation of a vehicle, so recently, an electric supercharger that drives a compressor by using an electric motor to compress intake air and supplies the same is applied to a vehicle.

In a vehicle employing the foregoing turbo charger or supercharger, when a driver manipulates a brake pedal in a state in which he or she steps on an accelerator pedal to its maximum level to make an engine enter a wide open throttle (WTO) region, static pressure formed in an intake manifold is not smoothly discharged, failing to form sufficient vacuum pressure for boosting a brake, so the brake is pushed out.

Also, for example, even when a vehicle is run on a high ground, vacuum pressure formed by an intake manifold may not be sufficient for boosting a brake.

The failure of smoothly performing a brake boosting operation due to insufficient vacuum pressure therefore formed by the intake manifold and supplied to a brake device may be vital for a safe operation of a vehicle, and thus, a vacuum pump for sufficiently supplying brake vacuum pressure is installed in a vehicle.

However, an installation of a vacuum pump to form vacuum pressure for brake boosting operation may increase a weight and cost of a vehicle, for which, thus, an improvement method therefore is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vacuum pressure forming device for a brake of a vehicle having advantages of smoothly forming sufficient brake vacuum pressure by operating an electric supercharger when sufficient brake vacuum pressure for brake boosting operation is not formed in a vehicle employing the electric supercharger.

In an aspect of the present invention, a brake vacuum pressure forming device for a motor vehicle, may include a vacuum chamber supplying a vacuum pressure boosting a break operating force, an electric supercharger connected to the vacuum chamber to supply vacuum pressure thereto, a first vacuum pressure supply path connecting the electric supercharger and the vacuum chamber, and a vacuum pressure control valve mounted on the first vacuum pressure supply path and opening and closing the first vacuum pressure supply path.

The brake vacuum pressure forming device may include a cylinder block forming a combustion chamber, an intake manifold connected to the cylinder block to supply ambient air thereto, a turbo charger compressing ambient air by using pressure of exhaust gas discharged from the combustion chamber and supplying the ambient air to the combustion chamber, an intercooler cooling a compressed air supplied from the turbo charger to the combustion chamber, a first supercharge path connecting the turbo charger and the intercooler, a second supercharge path connecting the intercooler and the intake manifold, an intake path connecting the electric supercharger and the second supercharge path, and an opening and closing valve mounted on the intake path and opening and closing the intake path.

A boost pressure control valve is installed in the second supercharge path and controls the compressed air introduced to the intake manifold through the intercooler.

The intake path is connected to the second supercharge path between the boost pressure control valve and the intercooler.

A recirculation valve is installed in the second supercharge path between the boost pressure control valve and the intake manifold in order to selectively allow the second supercharge path to communicate with the outside.

The vacuum chamber is connected to the intake manifold through a second vacuum pressure supply path.

The opening and closing valve and the vacuum pressure control valve form an integrated valve unit.

The brake vacuum pressure forming device may further include a pressure sensor sensing pressure of the vacuum chamber, and an engine control unit controlling the electric supercharger, the recirculation valve, the vacuum pressure control valve, the opening and closing valve, and the boost pressure control valve according to pressure sensed by the pressure sensor.

The engine control unit controls the vacuum pressure control valve to open the first vacuum pressure supply path when the vacuum pressure sensed by the pressure sensor is equal to or lower than a pre-set value, controls the opening and closing valve to close the intake path, controls the boost pressure control valve to close the second supercharge path, controls the recirculation valve to shut the second supercharge path against the outside, and controls the electric supercharger to be operated.

A pressure sensor sensing boost pressure of the second supercharge path is installed, and when the boost pressure sensed by the pressure sensor is equal to or higher than a target boost pressure, the engine control unit controls the boost pressure control valve and the recirculation valve to be opened.

In the case of the brake vacuum pressure forming device for a motor vehicle according to an embodiment of the present invention, brake vacuum pressure formed by the intake manifold while a vehicle is running is sensed, and when it is determined that the brake vacuum pressure formed by the intake manifold is not sufficient, the electric supercharger is operated to supply brake vacuum pressure to the vacuum chamber configured for supplying brake vacuum pressure. Thus, appropriate brake vacuum pressure is constantly formed while a vehicle is running, thus ensuring safe vehicle operation.

Also, when boost pressure of compressed air supplied to the intake manifold through the turbo charger is increased to be equal to or higher than target boost pressure, the compressed air is appropriately discharged to the outside, effectively preventing surge of the engine.

In addition, there is no need to use a vacuum pump to form brake vacuum pressure, and also, there is no need to install a valve for discharge compressed air to the outside when boost pressure is formed. Also, the configuration of the device is simple, reducing a weight of the vehicle and cost.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a view illustrating a configuration of a vacuum pressure forming device for a brake of a vehicle according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the FIGURES, reference numbers refer to the same or equivalent parts of the present invention throughout the several FIGURES of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the accompanying drawings.

Referring to FIG. 1, an intake manifold 20 allowing air or a mixture of air and fuel to be introduced therein is connected to a cylinder block 10 forming a combustion chamber of an engine, and an exhaust manifold 30 for discharging exhaust gas generated after combustion in the combustion chamber from the cylinder block 10 is connected to the cylinder block 10.

A turbo charger TC is connected to the exhaust manifold 30 and the intake manifold charger 20, respectively, in order to compress air by using pressure of exhaust gas discharged through the exhaust manifold 30 and supply the compressed air to the intake manifold 20.

Namely, a turbine constituting the turbo charger TC is connected to the exhaust manifold 30 and an impeller constituting the turbo charger TC is connected to the intake manifold 20.

Also, an exhaust path 40 is connected to the exhaust manifold 30 in order to induce exhaust gas introduced to the exhaust manifold 30 to the outside.

A catalytic converter is installed in the exhaust path 40 in order to reduce harmful components included in exhaust gas discharged through the exhaust path 40. The catalytic converter may include a warm-up catalytic converter (WCC) and an under floor catalytic converter (UCC).

A recirculation path 42 is connected to the exhaust path 40 between the two catalytic converters WCC and UCC in order to recirculate a portion of exhaust gas to the cylinder block 10, and an exhaust gas recirculation cooler 50 is installed in the recirculation path 42 in order to reduce temperature of exhaust gas.

An intake path 52 allowing ambient air to flow thereto is connected to the turbo charger TC, and the recirculation path 42 is connected to the intake path 52, so the turbo charger TC compresses a portion of exhaust gas and ambient gas and supplies the same to the cylinder block 10.

In order to control exhaust gas introduced to the intake path 52 through the recirculation path 42, a control valve 60 is installed in the recirculation path 42.

An air cleaner 70 filtering foreign materials included in ambient air and a bypass valve 80 are installed in the intake path 52.

An outlet of the turbo charger TC is connected to the intake manifold 20 through a supercharge path.

An intercooler 90 is installed midway in the supercharge path in order to cool supercharged air discharged after being compressed by the turbo charger TC and supply the same to the intake manifold 20.

Namely, an outlet of the turbo charger TC and an inlet of the intercooler 90 are connected through a first supercharge path 92a, and an outlet of the intercooler 90 and the intake manifold 20 are connected through a second supercharge path 92b.

A boost pressure control valve 100 is installed in the second supercharge path 92b in order to control supercharged air introduced to the intake manifold 20 through the intercooler 90.

An electric supercharger 110 is provided to additionally compress compressed air to be supplied to the intake manifold 20.

An inlet of the electric supercharger 110 is connected to the second supercharge path 92b between the intercooler 90 and the boost pressure control valve 100 through the intake path 112, and an outlet of the electric supercharger 110 is connected to the second supercharge path 92b between the boost pressure control valve 100 and the intake manifold 20 through a discharge path 114.

A vacuum chamber 120 is connected to the intake path 112 through a first vacuum pressure supply path 122, and the vacuum chamber 120 is connected to the intake manifold 20 through a second vacuum pressure supply path 124.

Also, the vacuum chamber 120 is connected to a brake booster 130 boosting upon receiving operating force from a brake pedal. Thus, when the brake booster 130 performs a boosting operation, pressure of the vacuum chamber 120 acts as vacuum pressure.

In order to control vacuum pressure supplied to the vacuum chamber 120 through the first vacuum pressure supply path 122, a vacuum pressure control valve 140 is installed in the first vacuum pressure supply path 122. An opening and closing valve 150 is installed in the intake path 112 to open and close the intake path 112. The vacuum pressure control valve 140 and the opening and closing valve 150 may be integrated to be configured as a valve unit.

A recirculation valve RCV is installed as an air vent valve in the second supercharge path 92b between the boost pressure control valve 100 and the intake manifold 20 in order to selectively discharge compressed air from the second supercharge path 92b to the outside.

The recirculation valve RCV also serves to prevent surge of the engine.

A pressure sensor 160 is installed in the intake manifold 20, the second vacuum pressure supply path 124, or the vacuum chamber 120 in order to sense vacuum pressure of the vacuum chamber 120. The pressure sensor 160 is also installed in the second supercharge path 92b in order to sense boost pressure formed in the second supercharge path 92b.

Also, the pressure sensor 160 is connected to an input terminal of an engine control unit (ECU) so that a pressure signal sensed by the pressure sensor 160 is input to an electronic control unit or the engine control unit (ECU).

The electric supercharger 110, the recirculation valve RCV, the boost pressure control valve 100, the opening and closing valve 120, and the vacuum pressure control valve 140 are connected to an output terminal of the ECU, and operations thereof are controlled according to a control signal from the ECU.

Vacuum pressure generated by the intake manifold 20 while a vehicle is running acts on the vacuum chamber 120 through the second vacuum pressure supply path 124 to form vacuum pressure in the vacuum chamber 120, and power assistance is formed by using the vacuum pressure formed in the vacuum chamber 120 when the brake booster 130 performs a braking operation, thus allowing for a smooth braking operation.

While a vehicle is running, the ECU senses vacuum pressure generated in intake manifold 20 or the second vacuum pressure supply path 124 by the medium of the pressure sensor 160. When the ECU determines that the sensed vacuum pressure is not sufficient for a brake boosting operation, the ECU operates the electric supercharger 110 (M:ON) to supply vacuum pressure to the vacuum chamber 120.

Namely, the ECU compares the sensed vacuum pressure with a pre-set value, and when the sensed vacuum pressure is equal to or lower than the pre-set value, the ECU applies an operation signal to the electric supercharger 110 to operate the electric supercharger 110.

The ECU applies a control signal to the vacuum pressure control valve 140 to open the first vacuum pressure supply path 122, the opening and closing valve 150 is turned off to shut the intake path 112, the boost pressure control valve 100 is turned off to shut the second supercharge path 92b, and the recirculation valve RCV is turned off to shut the second supercharge path 92b against the outside.

According to an operation of the electric supercharger 110, vacuum pressure is formed in an inlet of the electric supercharger 110, and the generated vacuum pressure acts on the vacuum chamber 120 through the vacuum pressure control valve 140 an the first vacuum pressure supply path 122 to form appropriate vacuum pressure in the vacuum chamber 120.

Accordingly, the brake booster 130 performs a boosting operation by using the appropriate vacuum pressure formed in the vacuum chamber 120, performing a normal braking operation.

Meanwhile, positive pressure is formed in a discharge opening of the electric supercharger 110, which should be appropriately discharged to the outside. To this end, the ECU applies a control signal to the recirculation valve RCV to open it, whereby compressed air present in the second supercharge path 92b is released to the outside through the recirculation valve RCV, appropriately resolving the positive pressure.

Also, the ECU senses boost pressure in the second boost pressure supply path 92b by the medium of the pressure sensor 160, and determines whether the boost pressure in the second boost pressure supply path 92b has been excessively increased due to the operation of the turbo charger TC and the OFF operation of the boost pressure control valve 100.

When the boost pressure is higher than a target boost pressure, the ECU applies a control signal to the boost pressure control valve 100 to control the boost pressure control valve 100 to open the second supercharge path 92b, and also applies a control signal to the recirculation valve (RCV) to open it, whereby the compressed air in the second supercharge path 92b is released to the outside through the recirculation valve (RCV), resolving excessive boost pressure.

As described above, when it is determined that intake vacuum pressure generated by the intake manifold 20 is not sufficient, the electric supercharger 110 is operated to supplement brake vacuum pressure, and when intake vacuum pressure is sufficient, intake vacuum pressure of the intake manifold 20 is appropriately used. Thus, there is no need to install a vacuum pump to supplement brake vacuum pressure.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake vacuum pressure forming device for a motor vehicle, the device comprising:
   a vacuum chamber supplying a vacuum pressure boosting a brake operating force;
   an electric supercharger connected to the vacuum chamber to supply vacuum pressure thereto;
   a first vacuum pressure supply path connecting the electric supercharger and the vacuum chamber;
   a vacuum pressure control valve mounted on the first vacuum pressure supply path and opening and closing the first vacuum pressure supply path;
   a cylinder block forming a combustion chamber;
   an intake manifold connected to the cylinder block to supply ambient air thereto;
   a turbo charger compressing ambient air by using pressure of exhaust gas discharged from the combustion chamber and supplying the ambient air to the combustion chamber;

an intercooler cooling a compressed air supplied from the turbo charger to the combustion chamber;
a first supercharge path connecting the turbo charger and the intercooler;
a second supercharge path connecting the intercooler and the intake manifold;
an intake path connecting the electric supercharger and the second supercharge path; and
an opening and closing valve mounted on the intake path and opening and closing the intake path.

2. The brake vacuum pressure forming device of claim 1, wherein a boost pressure control valve is installed in the second supercharge path and controls the compressed air introduced to the intake manifold through the intercooler.

3. The brake vacuum pressure forming device of claim 2, wherein the intake path is connected to the second supercharge path between the boost pressure control valve and the intercooler.

4. The brake vacuum pressure forming device of claim 3, wherein a recirculation valve is installed in the second supercharge path between the boost pressure control valve and the intake manifold in order to selectively allow the second supercharge path to communicate with the outside.

5. The brake vacuum pressure forming device of claim 4, wherein the vacuum chamber is connected to the intake manifold through a second vacuum pressure supply path.

6. The brake vacuum pressure forming device of claim 5, further comprising:
a pressure sensor sensing pressure of the vacuum chamber; and
an engine control unit controlling the electric supercharger, the recirculation valve, the vacuum pressure control valve, the opening and closing valve, and the boost pressure control valve according to pressure sensed by the pressure sensor.

7. The brake vacuum pressure forming device of claim 6, wherein the engine control unit
controls the vacuum pressure control valve to open the first vacuum pressure supply path when the vacuum pressure sensed by the pressure sensor is equal to or lower than a pre-set value,
controls the opening and closing valve to close the intake path,
controls the boost pressure control valve to close the second supercharge path,
controls the recirculation valve to shut the second supercharge path against the outside, and
controls the electric supercharger to be operated.

8. The brake vacuum pressure forming device of claim 6, wherein
a pressure sensor sensing boost pressure of the second supercharge path is installed, and
when the boost pressure sensed by the pressure sensor is equal to or higher than a target boost pressure, the engine control unit controls the boost pressure control valve and the recirculation valve to be opened.

9. The brake vacuum pressure forming device of claim 1, wherein the opening and closing valve and the vacuum pressure control valve form an integrated valve unit.

* * * * *